April 20, 1954   C. A. JARVIS   2,675,843
FRUIT PITTER AND SLICER
Filed June 15, 1951

INVENTOR.
CHARLES A. JARVIS
BY
McMorrow, Berman + Davidson
ATTORNEYS

Patented Apr. 20, 1954

2,675,843

UNITED STATES PATENT OFFICE 2,675,843

FRUIT PITTER AND SLICER

Charles Agustus Jarvis, Ventura, Calif.

Application June 15, 1951, Serial No. 231,785

2 Claims. (Cl. 146—28)

This invention relates to a combination fruit pitter and slicer, and more particularly to a device for separating fruits such as apricots, peaches, plums and the like from their pits.

A main object of the invention is to provide a novel and improved combination fruit pitter and slicer which is simple in construction, which is easy to operate, and which freely separates fruits such as peaches, apricots, plums and the like from their pits, and cuts the fruits into two halves.

A further object of the invention is to provide an improved combination fruit pitter and slicer which is inexpensive to manufacture, which is rugged in construction, and wherein the blade elements are readily replaceable.

Further objects and advantages of the invention will become apparent from the following description and claims, and from the accompanying drawings, wherein:

Figure 4:
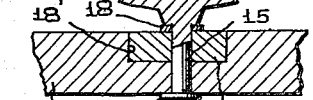
Figure 4 is a cross-sectional, detail view taken on the line 4—4 of Figure 2.

Referring to the drawings, and more particularly to Figures 1 to 4, one form of improved fruit pitter and slicer according to the present invention is designated generally at 11 and comprises a U-shaped clamp 16 having the bight portion 15', said bight portion being formed with a stud member 15 projecting substantially at right angles therefrom. Designated at 12 and 13 are respective arms which are arranged in crisscross relation and connected at the crisscross point to the stud member 15 for rotational movement toward and away from each other, said stud member being formed at its end with a reduced threaded portion 14 on which is engaged a washer 17 and a nut 16, as shown in Figure 4. A bearing washer 18 is provided on the stud 15, cooperating with the washer 17 to hold the intermediate portion of the arm 12 close to the intermediate portion of the arm 13 while permitting relative rotation between the arms. As shown in Figure 4, the arm 12 is formed with a generally circular recess 18' and the intermediate portion of the arm 13 is formed with a generally circular boss portion fitting rotatably into the recess 18'.

Figure 1:
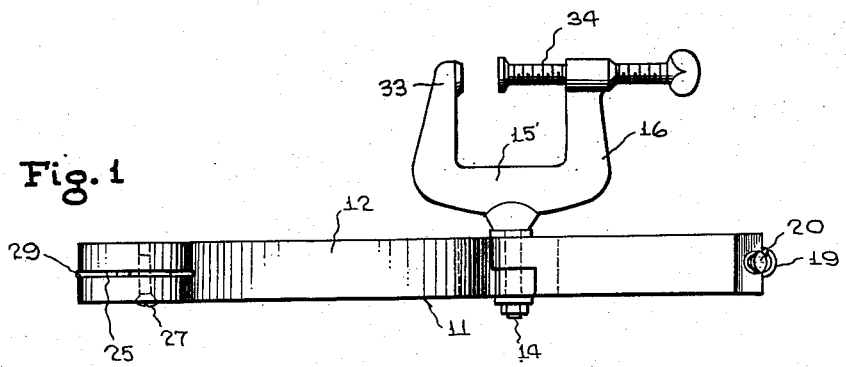
Figure 1 is a side elevational view of an improved combination fruit pitter and slicer constructed in accordance with the present invention.
Figure 2:
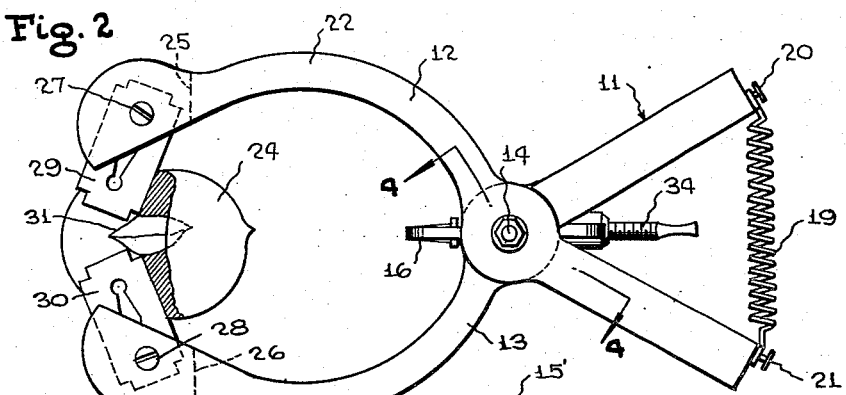
Figure 2 is a front elevational view of the combination fruit pitter and slicer shown in Figure 1.
Figure 3:
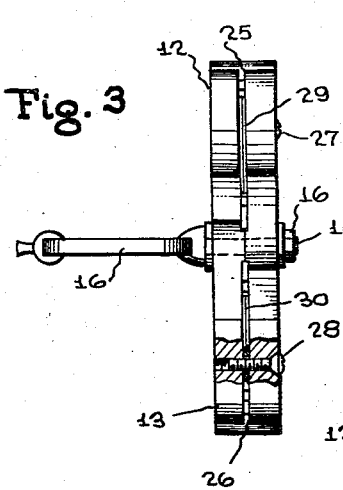
Figure 3 is a top plan view of the combination fruit pitter and slicer of Figures 1 and 2.

The rear end portions of the arms 13 and 12 are connected by a coil spring 19, the end of the spring being engaged on respective pins 20 and 21 secured to the ends of the arms 13 and 12, whereby the rear end portions of said arms are biased toward each other. The action of spring 19 also biases the forward end portions of the arms toward each other. As shown in Figure 2, the forward end portions of the arms 12 and 13 are outwardly bowed, as shown at 22 and 23, defining a generally oval space therebetween adapted to receive a fruit, such as the fruit 24. The forward ends of the arms 22 and 23 are formed with the longitudinal, coplanar slots 25 and 26, and received in said slots are respective razor blades 29 and 30, said blades being secured in the slots by respective machine screws 27 and 28. As shown in Figure 3, the left ends of the machine screws are threadedly engaged in the portions of the arms 12 and 13 at the left sides of the slots 25 and 26, whereby the razor blades 29 and 30 may be rigidly clamped in the slots by tightening the machine screws. As shown in Figure 2, the blades 29 and 30 are positioned so that their inner edges converge toward each other.

In using the device, the fruit 24 is held between the thumb and forefinger of the operator, said fruit being initially positioned between the outwardly bowed portions 22 and 23 of the arms 12 and 13. The fruit is drawn outwardly through the razor blades, the edges of the blades engaging on the pit 31 and being drawn thereover, whereby the fruit is cut into two halves as it is passed through the blades. The spring 19 exerts biasing pressure urging the blades toward each other and causing the blade edges to follow the contour of the pit 31 as the fruit is drawn through the blades.

It will be understood that the device may be mounted in any suitable location, such as the edge of a table, the table edge being received between the anvil portion 33 and the clamping screw 34 of the U-shaped clamp, whereby the device will be mounted in a rigid manner when the clamping screw 34 is tightened.

The two halves of the fruit may be readily separated after they have been sliced apart by passage through the blades 29 and 30, whereby said two halves may be removed from the pit 31.

Figure 5:
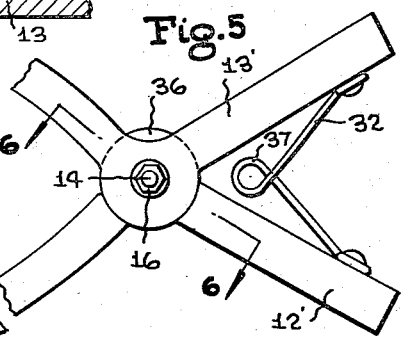
Figure 5 is a fragmentary front elevational view of the joint portion of a modified form of fruit pitter and slicer according to the present invention.
Figure 6:
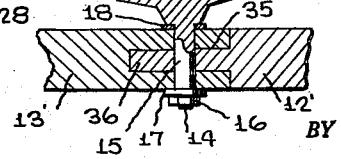
Figure 6 is a cross-sectional view taken on the line 6—6 of Figure 5.

In the form of the invention shown in Figures 5 and 6, the respective arms shown at 12' and 13' are general V shaped and are pivotally connected together by being rotatably mounted on the stud 15 at their apex portions. As shown in Figure 6, the arm 13' is formed with a groove 35, and the arm 12' is formed with a tongue portion 36 received in the groove 35 and rotatable therein. As in the form of the invention shown in Figures 1 to 4, the arms are pivotally secured by means of the nut 16 engaged on the reduced threaded portion 14 of the stud 15, the respective bearing washers 17 and 18 being provided on the stud on opposite sides of the pivotal joint. The rear portions of the arms 13' and 12' are biased apart by a suitable spring 32, which may comprise a length of relatively stiff spring wire looped at 37 and connected at its ends to the rear portions of the respective arms 12' and 13' to exert spring biasing action urging said rear portions apart. Since the rear portions of the arms 12' and 13' are biased away from each other, the forward portions of said arms will be biased toward each other, providing the spring biasing action on the razor blades 29 and 30, whereby said razor blades engage the pit of the fruit as the fruit is drawn outwardly through the blades in the manner described above.

While certain specific embodiments of an improved combination fruit pitter and slicer have been shown in the foregoing description, it will be understood that various modifications within the spirit of the invention may occur to those skilled in the art. Therefore, it is intended that no limitations be placed on the invention except as defined by the scope of the appended claims.

What is claimed is:

1. A fruit pitter and slicer comprising an upstanding U-shaped clamp, a clamping element rotatably supported in one of the legs of said clamp adjacent the free end thereof and coacting with means formed on the other of the legs of said clamp for attaching said clamp to a supporting surface, a vertically disposed stud element arranged exteriorly of said clamp and having the upper end secured to the bight of said clamp, a pair of horizontally disposed arms arranged in crisscross relation and connected at the crisscross point to said stud element for rotational movement toward and away from each other, a pair of razor blades arranged in end to end face relation positioned transversely of and between forward ends of the arms and each blade having the non-facing end fixedly secured to the adjacent arm, and spring means extending transversely between said arms adjacent the other ends thereof and secured to said other ends for biasing said arms toward each other.

2. A fruit pitter and slicer comprising an upstanding U-shaped clamp, a clamping element rotatably supported in one of the legs of said clamp adjacent the free end thereof and coacting with means formed on the other of the legs of said clamp for attaching said clamp to a supporting surface, a vertically disposed stud element arranged exteriorly of said clamp and having the upper end secured to the bight of said clamp, a pair of horizontally disposed arms arranged in crisscross relation and connected at the crisscross point to said stud element for rotational movement toward and away from each other, there being a longitudinally extending slot in the forward end of each of said arms, said slots being co-planar with each other, a pair of razor blades arranged in end to end face relation positioned transversely of and between said forward ends of said arms and each blade having the non-facing end extending into the slot of the adjacent arm and fixedly secured to the latter arm, and spring means extending transversely between said arms adjacent the other ends thereof and secured to said other ends for biasing said arms toward each other.

References Cited in the file of this patent

UNITED STATES PATENTS

| Number | Name | Date |
|---|---|---|
| 466,453 | Burns | Jan. 5, 1892 |
| 889,458 | Good | June 2, 1908 |
| 1,702,801 | Smith | Feb. 19, 1929 |
| 2,089,774 | Wachstein | Aug. 10, 1937 |
| 2,185,090 | Millen | Dec. 26, 1939 |
| 2,317,669 | Chekian | Apr. 27, 1943 |
| 2,514,120 | Chenelte | July 4, 1950 |